US012699181B2

(12) United States Patent
Kim

(10) Patent No.: US 12,699,181 B2
(45) Date of Patent: *Aug. 4, 2026

(54) METHOD AND APPARATUS WITH VEHICLE RADAR CONTROL

(71) Applicant: Samsung Electronics Co., Ltd., Suwon-si (KR)

(72) Inventor: Byung Kwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 486 days.

This patent is subject to a terminal disclaimer.

(21) Appl. No.: 18/090,804

(22) Filed: Dec. 29, 2022

(65) Prior Publication Data

US 2023/0136923 A1 May 4, 2023

Related U.S. Application Data

(63) Continuation of application No. 16/166,905, filed on Oct. 22, 2018, now Pat. No. 11,567,191.

(30) Foreign Application Priority Data

May 25, 2018 (KR) ........................ 10-2018-0059849

(51) Int. Cl.
*G01S 13/93* (2020.01)
*G01S 7/295* (2006.01)
(Continued)

(52) U.S. Cl.
CPC ............ G01S 13/931 (2013.01); G01S 7/295 (2013.01); G01S 13/103 (2013.01);
(Continued)

(58) Field of Classification Search
CPC ...... G01S 13/931; G01S 7/295; G01S 13/103; G01S 2013/0254; H01Q 1/3233; H01Q 3/34
See application file for complete search history.

(56) References Cited

U.S. PATENT DOCUMENTS 5,442,362 A * 8/1995 Zwarts .................... G01S 13/10
342/197
8,289,203 B2 10/2012 Culkin et al.
(Continued)

FOREIGN PATENT DOCUMENTS

CN 106374235 A 2/2017
JP 3195048 B2 8/2001
(Continued)

OTHER PUBLICATIONS

A. Hassanien, et al., "Phased-MIMO Radar: A Tradeoff Between Phased-Array and MIMO Radars," *IEEE Transaction on Signal Processing*, vol. 58, Issue 6, Jun. 2010, pp. 1-23.
(Continued)

*Primary Examiner* — Resha Desai
*Assistant Examiner* — Helena H Seraydaryan
(74) *Attorney, Agent, or Firm* — NSIP Law

(57) ABSTRACT

A method and apparatus with vehicle radar control is disclosed. An apparatus with vehicle radar control includes a radio frequency (RF) transceiver including a transmitting antenna array and a receiving antenna array, and at least one processor configured to collect environmental information of the vehicle, determine a radar mode of the vehicle based on the collected environmental information, generate one or more control signal configured to control one or more of the transmitting antenna array and the receiving antenna array based on the determined radar mode, and provide the generated one or more control signals to the RF transceiver, wherein one or more of the transmitting antenna array and the receiving antenna array operate according to the one or more generated control signals.

6 Claims, 8 Drawing Sheets

(51) Int. Cl.

| | | |
|---|---|---|
| *G01S 13/10* | (2006.01) | |
| *G01S 13/931* | (2020.01) | |
| *H01Q 1/32* | (2006.01) | |
| *H01Q 3/34* | (2006.01) | |
| *H04B 7/0413* | (2017.01) | |
| *G01S 13/02* | (2006.01) | |

(52) U.S. Cl.
CPC ............. *H01Q 1/3233* (2013.01); *H01Q 3/34* (2013.01); *H04B 7/0413* (2013.01); *G01S 2013/0254* (2013.01); *G01S 2013/9322* (2020.01)

(56) References Cited

U.S. PATENT DOCUMENTS

| | | | |
|---|---|---|---|
| 2006/0287826 A1* | 12/2006 | Shimizu ............. | G01C 21/3602 701/431 |
| 2010/0271720 A1* | 10/2010 | Marenco ................. | B60R 1/025 359/843 |
| 2012/0188117 A1 | 7/2012 | Jeong | |
| 2014/0097979 A1 | 4/2014 | Nohara et al. | |
| 2016/0274231 A1 | 9/2016 | Lee et al. | |
| 2016/0327641 A1 | 11/2016 | Madia et al. | |
| 2016/0352407 A1 | 12/2016 | Ling | |
| 2017/0003392 A1* | 1/2017 | Bartlett ................... | G01S 17/42 |

| | | | |
|---|---|---|---|
| 2017/0115377 A1* | 4/2017 | Giannini .................... | G01S 7/35 |
| 2017/0293025 A1* | 10/2017 | Davis ..................... | G01S 7/0233 |
| 2017/0309997 A1 | 10/2017 | Alland et al. | |
| 2018/0149736 A1 | 5/2018 | Alland et al. | |
| 2018/0217255 A1 | 8/2018 | Kim | |
| 2018/0321368 A1 | 11/2018 | Bharadwaj et al. | |
| 2019/0195990 A1* | 6/2019 | Shand .................... | G01S 7/4861 |
| 2019/0277962 A1 | 9/2019 | Ingram et al. | |

FOREIGN PATENT DOCUMENTS

| | | | |
|---|---|---|---|
| JP | 3389956 | B2 | 3/2003 |
| JP | 2007-514171 | A | 5/2007 |
| JP | 2007-225597 | A | 9/2007 |
| JP | 4814261 | B2 | 11/2011 |
| JP | 6266407 | B2 | 1/2018 |
| KR | 10-1223804 | B1 | 1/2013 |
| KR | 10-1228697 | B1 | 2/2013 |
| KR | 10-2015-0108680 | A | 9/2015 |
| KR | 10-2017-0011882 | A | 2/2017 |
| WO | WO 2014/187652 | A1 | 11/2014 |

OTHER PUBLICATIONS

Korean Office Action issued on Jun. 30, 2022, in counterpart Korean Patent Application No. 10-2018-0059849 (3 pages in English and 6 pages in Korean).

* cited by examiner

FIG. 2

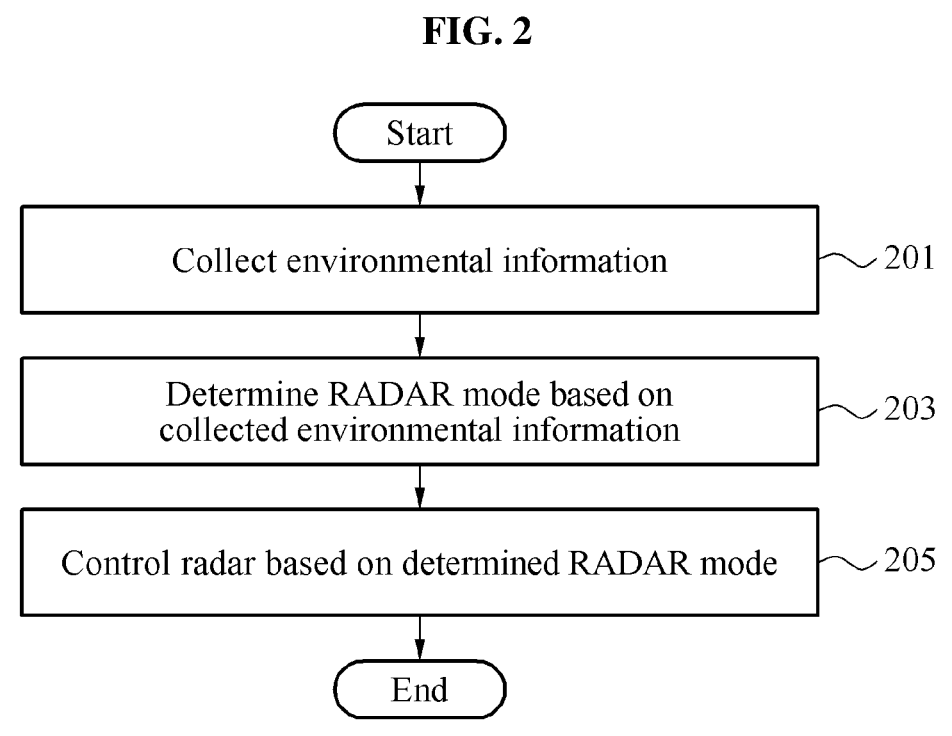

```
                    ┌─────────────┐
                    │    Start    │
                    └─────────────┘
                           │
                           ▼
   ┌──────────────────────────────────────────────┐
   │       Collect environmental information       │────~ 201
   └──────────────────────────────────────────────┘
                           │
                           ▼
   ┌──────────────────────────────────────────────┐
   │          Determine RADAR mode based on        │
   │        collected environmental information     │────~ 203
   └──────────────────────────────────────────────┘
                           │
                           ▼
   ┌──────────────────────────────────────────────┐
   │    Control radar based on determined RADAR mode│────~ 205
   └──────────────────────────────────────────────┘
                           │
                           ▼
                    ┌─────────────┐
                    │     End     │
                    └─────────────┘
```

METHOD AND APPARATUS WITH VEHICLE RADAR CONTROL

This application is a continuation of U.S. patent application Ser. No. 16/166,905, filed on Oct. 22, 2018, which claims the benefit under 35 USC § 119(a) of Korean Patent Application No. 10-2018-0059849, filed on May 25, 2018 in the Korean Intellectual Property Office, the entire disclosures of which are incorporated herein by reference for all purposes.

BACKGROUND

1. Field

The following description relates to a method and apparatus with vehicle radar control.

2. Description of Related Art

Radar for a vehicle may be a device configured to measure at least a position or a velocity of an object in relation to the vehicle. The radar may be located on one or more of a front side, a lateral side, or a rear side of the vehicle, among other locations. The radar detects target objects within a field of view (FoV) and range of the radar. In general, the space in which the radar may be located on a vehicle is limited. In addition, cost and performance associated with the radar may further limit design and implementation of vehicle-based radar. As a result of these limitations, a target object may not be detected by the radar.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle radar control method includes collecting environmental information of the vehicle, determining radar mode of the vehicle based on the collected environmental information, and controlling a transmitting antenna array or a receiving antenna array of the vehicle based on the determined radar mode.

The determining may include determining the radar mode from among a plurality of radar modes defined based on a detectable azimuth, a detectable range, or a detectable elevation.

The determining may include determining the radar mode from among a plurality of radar modes defined based on a detection rate, a detection area, or an angular resolution.

The determining may include determining the radar mode from among a digital beamforming mode, an analog beamforming mode, and a hybrid beamforming mode based on the detectable elevation.

The controlling may include changing one or more of an elevation and an azimuth of a radiation pattern emitted by the transmitting antenna array in response to a determined mode.

In response to the digital beamforming mode being determined to be the radar mode, the controlling may include controlling the transmitting antenna array using a multiple-input and multiple-output (MIMO) method.

In response to the analog beamforming mode being determined to be the radar mode, the controlling may include controlling the transmitting antenna array using a phased array method.

In response to the hybrid beamforming mode being determined to be the radar mode, the controlling may include controlling the transmitting antenna array using a combined method that is a combination of the MIMO method and the phased array method.

The determining may include determining the radar mode from among a short-range radar (SRR) mode, a medium-range radar (MRR) mode, and a long-range radar (LRR) mode based on the detectable azimuth and the detectable range.

The method may further include collecting information regarding a result of controlling the radar; and determining a radar mode based on the environmental information and a result of controlling the radar.

The method may further include collecting information regarding a result of controlling the radar; determining a reliability of the result of controlling the radar; and determining a radar mode based on the environmental information and the reliability of the result of controlling the radar.

The determining may include determining the radar mode based on a reliability of the result of controlling the radar.

The environmental information may include road environment information and object environment information.

A non-transitory computer-readable storage medium may store instructions that, when executed by a processor, may cause the processor to perform the method described above.

In another general aspect, an apparatus with vehicle radar control includes at least one processor and a radio frequency (RF) transceiver including a transmitting antenna array and a receiving antenna array. The processor collects environmental information of the vehicle, determines a radar mode of the vehicle based on the collected environmental information, generates a control signal configured to control one or more of the transmitting antenna array and receiving antenna array based on the determined radar mode; and provides the generated control signal to the RF transceiver, wherein one or more of the transmitting antenna array and the receiving antenna array operate according to the generated control signal.

The transmitting antenna array may include at least three antennas forming a two-dimensional (2D) array.

The transceiver may include a phase shifter configured to adjust a phase of the transmitting antenna array.

Each of a plurality of antennas included in the transmitting antenna array and the receiving antenna array may be independently controlled to be turned on or off according to the control signal.

The apparatus may further include a memory. The memory may be configured to store a plurality of radar modes that are defined based on a detectable azimuth, a detectable range, or a detectable elevation. The processor may determine the radar mode from among the plurality of radar modes. The memory also may be configured to store a plurality of radar modes corresponding to a detection rate, a detection area, or an angular resolution, The processor may determine the radar mode from among a digital beamforming mode, an analog beamforming mode, and a hybrid beamforming mode based on an azimuth or an elevation obtained from the environmental information.

The control signal may be configured to change one or more of an elevation and an azimuth of a radiation pattern emitted by the transmitting antenna array in response to a determined mode.

In response to the digital beamforming mode being determined to be the radar mode, the processor may control the transmitting antenna array using a MIMO method.

In response to the analog beamforming mode being determined to be the radar mode, the processor may control the transmitting antenna array using a phased array method.

In response to the hybrid beamforming mode being determined to be the radar mode, the processor may control the transmitting antenna array using a combined method that is a combination of a MIMO method and a phased array method.

The processor may be configured to determine the radar mode from among a short-range radar (SRR) mode, a medium-range radar (MRR) mode, and a long-range radar (LRR) mode based on the detectable azimuth and the detectable range.

The processor may be further configured to: collect information regarding a result of controlling the radar; and determine a radar mode based on the environmental information and a result of controlling the radar.

The processor may be further configured to: collect information regarding a result of controlling the radar; determine a reliability of the result of controlling the radar; and determine a radar mode based on the environmental information and the reliability of the result of controlling the radar.

In yet another general aspect, an apparatus for controlling a radar of a vehicle includes an RF transceiver including a first processor and a second processor. The first processor may collect environmental information of the vehicle and determine a radar mode of the vehicle based on the collected environmental information. The second processor may control a transmitting antenna array of the vehicle or a receiving antenna array of the vehicle based on the determined radar mode.

Other features and aspects will be apparent from the following detailed description, the drawings, and the claims.

BRIEF DESCRIPTION OF THE DRAWINGS

FIG. 2 is a flowchart illustrating an example of a method of controlling a radar of a vehicle.

Figure 1:
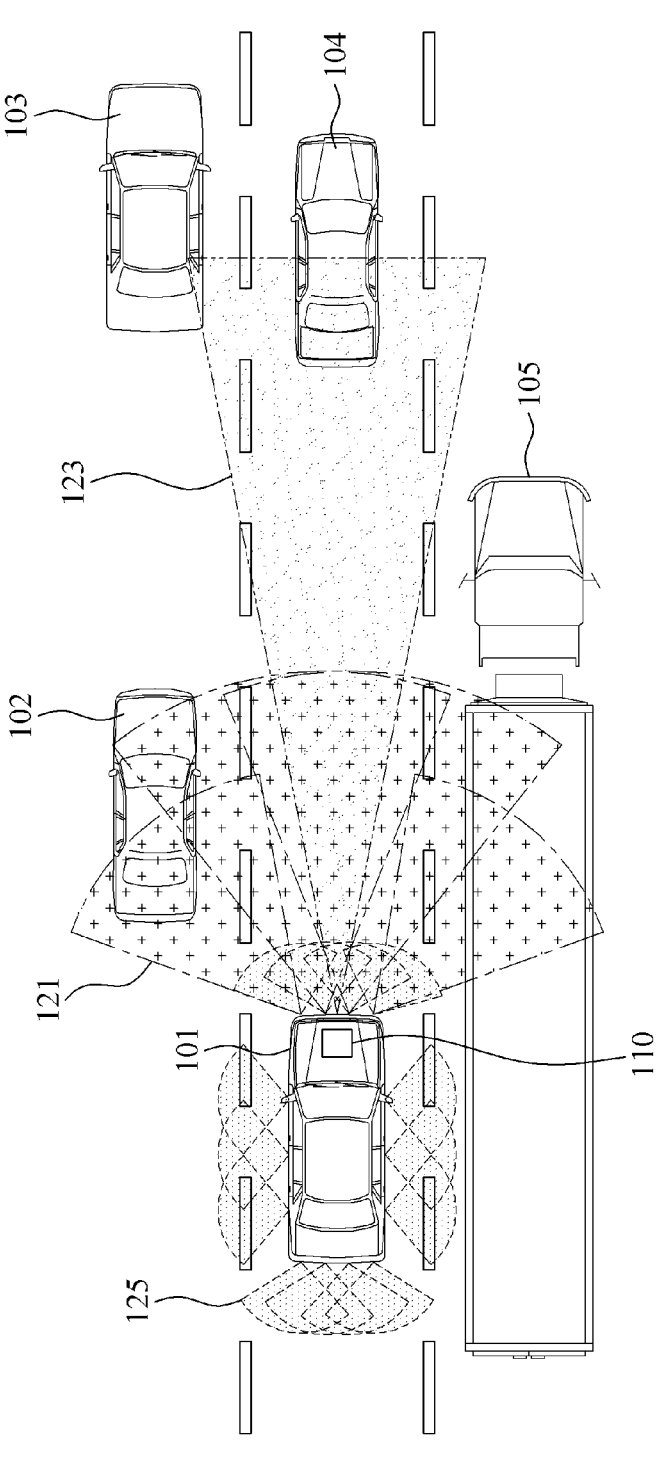
FIG. 1 is a diagram illustrating an example of the operation of an apparatus for controlling a radar of a vehicle.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after obtaining an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known after gaining an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after gaining an understanding of the disclosure of this application.

Throughout the specification, when an element, such as a layer, a region, or a substrate, is described as being "on," "connected to," or "coupled to" another element, the element may be directly "on," "connected to," or "coupled to" the other element, or there may be one or more other intervening elements. In contrast, when an element is described as being "directly on," "directly connected to," or "directly coupled to" another element, there are no other intervening elements. As used herein, the term "and/or" includes any one of the associated listed items and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in some examples described herein may also be referred to as a second member, component, region, layer, or section in other examples without departing from the teachings described herein.

The terminology used herein describes various examples only and is not intended to limit the disclosure. The articles "a," "an," and "the" are intended to include the plural forms unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the meaning as commonly understood by one of ordinary skill in the art to which this disclosure pertains and/or a meaning based on an understanding of the disclosure of the detailed description. Terms, such as those defined in commonly used dictionaries, are to be interpreted as having a meaning that is consistent with their meaning in the context of the relevant art and the disclosure provided herein, and the terms are not to be interpreted in an idealized or overly formal sense unless expressly so defined herein.

After gaining an understanding of the disclosure, if any one example of the detailed description of structures or functions are deemed to result in an ambiguous interpretation of an embodiment, such disclosure may be otherwise omitted for clarity.

FIG. 1 is a diagram illustrating an example of the operation of a vehicle radar controlling apparatus for a vehicle including radar. The radar detects target objects within a field of view (FoV) and range of the radar. However, there is a tradeoff between detection coverage (e.g., the range and/or the area of detection) and resolution when radar resources of the vehicle are limited. As a result of these constraints, target objects may not be detected by the radar. Therefore, the following description provides methods and systems that overcome or mitigate such limitations to provide more effective detection of target objects using the limited radar resources that may be available for the vehicle.

Referring to the example of FIG. 1, an environment 100 includes a vehicle 101 and target objects 102, 103, 104, and 105 shown in relation to the vehicle 101 traveling on a multi-lane road 107. The vehicle 101 includes a vehicle radar controlling apparatus 110. The vehicle radar controlling apparatus 110 may adaptively determine a radar mode based on the environment 100 in which a vehicle 101 is located. By using a radar mode determined to be best suited to the environment 100, the vehicle radar controlling apparatus 110 provides for more effective target detection than would otherwise be available from the limited resources of the vehicle 101.

In one example, the vehicle radar controlling apparatus 110 may select a radar mode from a number of pre-defined profiles that the radar controlling apparatus determines to be suitable for the environment 100 in which the vehicle 101 is located. For example, the vehicle radar controlling apparatus 110 may change a radiation pattern of the radar based on one or more factors, such as an elevation of a radar beam. In this example, the beam may include a radio frequency (RF) signal. The vehicle radar controlling apparatus 110 uses the one or more factors, such as elevation to determine a radiation pattern that is suitable for the environment 100 around the vehicle 101. As a result, the radar may more effectively detect a target object than would be possible using the unadjusted radiation pattern.

Figure 3:
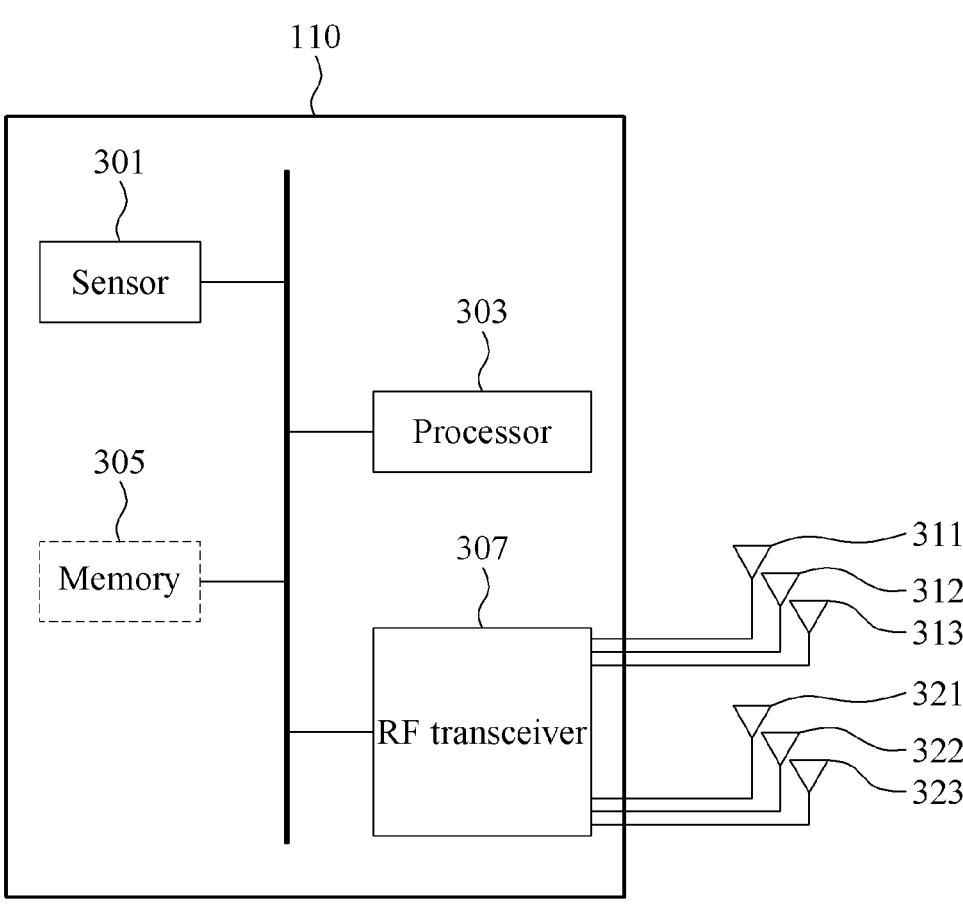
FIG. 3 is a diagram illustrating an example of an apparatus for controlling a radar of a vehicle.

In an example, the vehicle radar controlling apparatus 110 includes a sensor, a processor, and an RF transceiver (not shown in FIG. 1). The vehicle radar controlling apparatus 110 may further include a memory (also not shown in FIG. 1). Various components of the vehicle radar controlling apparatus 110 are shown in FIG. 3 and described in further detail in the following paragraphs.

The sensor obtains sensor data of an internal environment and/or an external environment of the vehicle 101. The sensor may include an internal sensor and/or an external sensor. The internal sensor detects an internal state of the vehicle 101. For example, the internal sensor may detect one or more of: a control signal of the vehicle 101; a rotation angle of the vehicle 101 through a steering wheel of the vehicle 101. The internal sensor may include, for example, an inertial measurement unit (IMU) configured to detect acceleration of the vehicle 101. The external sensor detects an external state of the vehicle 101. The external sensor may include, for example, a camera, a radar, a light detection and ranging (LIDAR) device or system, an ultrasonic sensor, and the like.

The processor is configured to determine environmental information of the vehicle 101 based on the sensor data obtained from a sensor. The environmental information determined by the processor may include road environment information and object environment information. Road environment information may include information associated with one or more of a width, a slope, a rotation radius, and/or information about a road on which the vehicle is traveling, such as the lanes of a road. Object environment information may include information associated with one or more of a position, a size, a speed, and/or a direction of an object. The object may include a target object and an occluded object. A target object refers to a target to be detected, and an occluded object refers to an object that may hinder detection of a target object.

For example, the processor may calculate a curvature and a slope of a road based on internal sensor data, such as a rotation angle of the steering wheel of the vehicle 101 and an acceleration detected from the IMU. The processor may calculate a width of the road and obtain lane information using data received from an external sensor, such as a camera. For example, the processor may process an image obtained from the camera to identify the road and an object (e.g., target or occluded).

The memory is configured to store a number of distinct radar modes. In one example, each radar mode may correspond to specific environmental information determined by the processor. A number of different radar modes may be defined for storage by the memory. For example, a radar mode may be based on one or more of: FoV, an azimuth, a range, and an elevation of a radiation pattern of a radar beam. For example, the FoV may refer to angle in within a horizontal plane that indicates the spread of the radar beams within the plane. The azimuth may refer to angle (positive or negative) formed between a reference direction (e.g., the direction of travel of the vehicle in a horizontal plane) and a line from the radar to a point of interest projected in the horizontal plane at which beams are directed. The range may refer to the maximum distance at which an object may be detected by the radar. The elevation may refer to an angle (positive or negative) in a vertical plane measured from the horizontal plane in which beams are directed. As described herein, selecting, determining, or changing the radar mode causes one or more of a detection rate, a detection area, or an angular resolution to change. In one example, the detection area may be defined by: 1) a FoV and a range, or 2) an azimuth, a range, and/or an elevation. Changing the radar mode can change: 1) only an azimuth; 2) only an elevation; or 3) both the azimuth and the elevation.

As describe above, the vehicle radar controlling apparatus 110 may determine or select a radar mode from a number of specific or pre-defined radar modes. For example, a digital beamforming mode, an analog beamforming mode, and a hybrid beamforming mode may be defined with regard to a detectable elevation and/or a detectable azimuth. In another example, a short-range radar (SRR) mode, a medium-range radar (MRR) mode, and a long-range radar (LRR) mode may be defined with regard to a detectable azimuth and a detectable range. The digital beamforming mode, the analog beamforming mode, the hybrid beamforming mode, the SRR mode, the MRR mode, and the LRR mode may be used in combination. However, the radar modes described above are provided merely as examples and various other types of radar modes also may be defined for use according to the teachings provided herein.

As described above, the processor is configured to determine or select a radar mode based on or corresponding to the determined environmental information. For example, the processor may determine the radar mode of the vehicle 101 from among a plurality of radar modes defined in advance. In one example, the processor may determine the radar mode that is best suited for the environment based on one or more factors determined from the environmental information including: a detectable azimuth, a detectable range, or a detectable elevation.

For example, when the slope of a road on which a vehicle 101 is traveling changes, the vehicle radar controlling apparatus 110 determines the radar mode of the vehicle 101 based on a detected elevation. In this example, the vehicle radar controlling apparatus 110 may choose from among the digital beamforming mode, the analog beamforming mode, and the hybrid beamforming mode that is best suited for the detected elevation. In another example, when the curvature of a road on which a vehicle 101 is traveling changes, the vehicle radar controlling apparatus 110 may determine the radar mode based on a detected azimuth. In this example, the vehicle radar controlling apparatus 110 may choose from among the digital beamforming mode, the analog beamforming mode, and the hybrid beamforming mode that is best suited for the detected azimuth. In another example, when the curvature of a road on which a vehicle 101 is traveling changes, the vehicle radar controlling apparatus 110 may determine the radar mode based on a detected azimuth and range. In this example, the vehicle radar controlling apparatus 110 may choose from among the SRR mode, the MRR mode, and the LRR mode that is best suited for the detected azimuth and range. In a non-limiting example, an SRR mode may have a scan range of 0.2 m to 30 m and an example field of view angle of 80°, an MRR mode may have a scan range of 0.2 m to 60 m and an example field of view angle of 60°, and an LRR mode may have a range of 0.2 m to 200 m and an example field of view angle of 18°.

The RF transceiver may include a plurality of antennas. In one example, the plurality of antennas forms a transmitting antenna array and a receiving antenna array. A plurality of antennas included in the transmitting antenna array may be arranged two-dimensionally to form a two-dimensional (2D) array. The vehicle radar controlling apparatus 110 may use the transmitting antenna array in which the antennas are arranged two-dimensionally to implement a number of beamforming modes allowing the direction of the radar to be changed by azimuth, elevation, and various combinations of azimuths and elevations.

The processor may control the antennas of the RF transceiver based on the determined radar mode. The RF transceiver transmits an RF signal based on a radiation pattern of a beam defined by the corresponding radar mode. The RF transceiver also receives RF signals reflected from objects that are external to the vehicle. The processor is configured to process a received RF signal to detect a target object.

Referring to FIG. 1, the vehicle 101 may use the vehicle radar controlling apparatus 110 to select one or more radar modes. For example, the vehicle 101 may use the vehicle radar controlling apparatus 110 to select a first radar mode, a second radar mode, or a third radar mode.

In one example, the first radar mode has a coverage characteristic of a medium azimuth, a medium range, and a medium elevation, and includes a combined mode that is a combination of the MRR mode and the hybrid beamforming mode. The second radar mode has a coverage characteristic of a small azimuth, a long range, and a small elevation, and includes a combined mode that is a combination of the LRR mode and the analog beamforming mode. The third radar mode has a coverage characteristic of a wide azimuth, a short range, and a wide elevation, and includes a combined mode that is a combination of the SRR mode and the digital beamforming mode.

The vehicle radar controlling apparatus 110 is configured to determine a radar mode based on a signal detected from the environment associated with the vehicle 101. For example, the vehicle radar controlling apparatus 110 may obtain speed information of the vehicle 101 from a speed sensor of the vehicle 101. The vehicle radar controlling apparatus 110 may calculate a curvature and a slope of a road based on a rotation angle of the steering wheel of the vehicle 101 and an acceleration detected from the IMU. In this example, when the speed information of the vehicle 101 is greater than or equal to a first threshold value, the vehicle radar controlling apparatus 110 determines a long-range detection is suitable for the vehicle environment. As a result, the vehicle radar controlling apparatus 110 selects the second radar mode which causes the RF transceiver to transmit an RF signal having a detection coverage area 123. The vehicle radar controlling apparatus 110 is configured to receive an RF signal reflected from any target objects within the coverage area, such as target objects 103 and 104. Therefore, the vehicle radar controlling apparatus 110 detects the target object 104 separated from the vehicle 101 by a long range.

In another example, when the speed of the vehicle 101 is between the first threshold value and a third threshold value, the vehicle radar controlling apparatus 110 determines a medium-range detection is suitable for the environment. As a result, the vehicle radar controlling apparatus 110 selects the first radar mode, which causes the RF transceiver to transmit an RF signal having a detection coverage area 121. The vehicle radar controlling apparatus 110 is configured to receive an RF signal reflected from any target objects within the coverage area 121, such as a target object 102. Therefore, the vehicle radar controlling apparatus 110 detects the target object 102 separated from the vehicle 101 by a medium range.

In another example, when a speed of the vehicle 101 is less than the third threshold value, the vehicle radar controlling apparatus 110 determines a short-range detection is suitable for the environment. As a result, the vehicle radar controlling apparatus 110 selects the second radar mode, which causes the RF transceiver to transmit an RF signal having a detection coverage 125. The vehicle radar controlling apparatus 110 is configured to receive an RF signal reflected from any target objects with the coverage area 124, such a target object 105. Therefore, the vehicle radar controlling apparatus 110 is able to determine whether the target object 105 comes closer to the vehicle 101 or not.

FIG. 2 is a flowchart illustrating an example of a method of controlling a radar of a vehicle.

Referring to FIG. 2, in operation 201, a vehicle radar controlling apparatus determines environmental information about a vehicle. The vehicle radar controlling apparatus may receive sensor data from the vehicle sensor, including the internal sensor and the external sensor of the vehicle. The vehicle radar controlling apparatus is configured to determine the environmental information of the vehicle based on the received sensor data. For example, the vehicle radar controlling apparatus processes the sensor data to classify the environmental information as road environment information and object environment information. The road environment information may include information associated with one or more of a width, a slope, a rotation radius, and/or information about a road on which the vehicle is traveling, such as the lanes of a road. The object environment information may include information associated with one or more of a position, a size, a speed, and/or a direction of an object, including a target object and an occluded object.

In operation 203, the vehicle radar controlling apparatus determines a radar mode of the vehicle based on the determined environmental information. As described herein, various radar modes may be defined in advance to correspond to different and/or specific road environment information and object environment information. For example, the vehicle radar controlling apparatus may determine the radar mode from a number of specific or pre-defined radar modes, such as the digital beamforming mode, the analog beamforming mode, and the hybrid beamforming mode.

In one example, in response to the vehicle radar controlling apparatus determining the digital beamforming mode as the radar mode, the vehicle radar controlling apparatus controls the transmitting antenna array using a multiple-input and multiple-output (MIMO) method. The MIMO method uses orthogonality of signals to distinguish between a plurality of RF signals transmitted from a plurality of antennas. The vehicle radar controlling apparatus causes the transmitting antenna array to radiate a plurality of beams at a desired elevation. In addition, the receiving antenna array receives reflected beans, and the controlling apparatus processes the signals received from the antenna array to determine an angular resolution corresponding to an elevated direction. For example, the vehicle radar controlling apparatus may obtain the angular resolution corresponding to the elevated direction by forming a virtual array between the transmitting antenna array and the receiving antenna array using the MIMO method. Thus, the vehicle radar controlling apparatus can cause the antenna array to radiate a plurality of beams having an elevation range greater than or equal to a predetermined value. In addition, the vehicle radar controlling apparatus may estimate an elevation of a target object based on a beam that is reflected and received by the antenna array.

In another example, in response to the vehicle radar controlling apparatus determining the analog beamforming mode as the radar mode, the vehicle radar controlling apparatus may control the transmitting antenna array using a phased array method. Using the phased array method, the vehicle radar controlling apparatus is configured to perform beamforming or beamsteering on a plurality of RF signals transmitted from the transmitting array. For example, the vehicle radar controlling apparatus is configured cause the transmitting array to form an integrated beam by adjusting the phase of a plurality of antennas included in the transmitting antenna array using a phase shifter. The vehicle radar controlling apparatus may thus cause the array to radiate a beam having an elevation range less than or equal to a predetermined value. In this example, the analog beamforming mode provides a relatively higher detection rate, gain, or resolution as compared to the digital beamforming mode of the previously described example.

In response to the vehicle radar controlling apparatus determining the hybrid beamforming mode as the radar mode, the vehicle radar controlling apparatus may control the transmitting antenna array using a combination of the MIMO method and the phased array method. For example, in the hybrid beamforming mode, the vehicle radar controlling apparatus is configured to select antennas from a plurality of antennas of the array to form a plurality of sub-arrays. In this example, one or more of the sub arrays are controlled using the phased array method, and one or more of the sub arrays are controlled using the MIMO method. According to this example, the hybrid beamforming mode provides: a relatively higher gain as compared to the digital beamforming mode described above, and a relatively higher angular resolution as compared to the analog beamforming mode described above. The proportion of the digital beamforming mode and the analog beamforming mode used in the hybrid beamforming mode may be adjusted to vary the gain and the resolution as desired for any particular application, conditions, or environmental information or the like.

In one example, the vehicle radar controlling apparatus controls the receiving antenna array using the MIMO method. Although the MIMO method may be generally used to receive a reflected signal, reception of signals is not limited thereto. For example, the receiving antenna array also may be controlled using the phased array method or a combination of the MIMO method and the phased array method.

In operation 205, the vehicle radar controlling apparatus controls the transmitting antenna array and/or the receiving antenna array of the vehicle based on the determined radar mode.

Although FIG. 2 is shown as one sequential process, it will be appreciated that the process may be performed iteratively by the vehicle radar controlling apparatus to continually collect and monitor environmental information and determine radar modes based on updated or changing information to periodically or continually control the radar based on the determined radar mode. Furthermore, in operation 203, the vehicle radar controlling apparatus may make further determinations based on one or more of feedback, changing environmental conditions, results of controlling the radar, and other factors such as reliability of results or control of radar.

In one example, the vehicle radar controlling apparatus may determine a single mode corresponding to the road environment information and the object environment information, or the vehicle radar controlling apparatus may change between multiple modes in sequential order. For example, the vehicle radar controlling apparatus may determine whether an object is present using a radar mode with a coverage characteristic having a wide radiation angle. When the object is determined to be present, the vehicle radar controlling apparatus may then change the radar mode to a radar mode with a coverage characteristic having a small radiation angle and perform high-resolution beamforming in a direction of the detected object.

In another example, the vehicle radar controlling apparatus may determine the radar mode of the vehicle based on the environmental information and as a result of controlling the radar. The result may be used as feedback by the vehicle radar controlling apparatus to change the radar mode of the vehicle. For example, when resolution is reduced by an environmental condition (e.g., due to precipitation, such as rain or snow), the vehicle radar controlling apparatus may process this condition as feedback to change from a radar mode that has a lower resolution to a different radar mode that provides a higher resolution.

In another example, the vehicle radar controlling apparatus determine a reliability of the result of controlling the radar. The vehicle radar controlling apparatus may use the determined reliability to change the radar mode. For example, when the reliability of a detection result associated with a portion of a beam radiation area is less than or equal to a threshold value, the vehicle radar controlling apparatus may scan the corresponding portion using a high-resolution radar mode with a small radiation coverage.

In another example, a processor may determine a difference between a detection result obtained from detection of an object using a vehicle sensor and a result of controlling the radar to detect the object. In one example, the processor measures a reliability by comparing the difference with a threshold value. As a result, the processor may calculate the disparity between a detection result obtained by the radar of the vehicle and a detection result obtained by another sensor of the vehicle, and measure reliability by comparing the disparity with a threshold value.

In another example, the processor may calculate a fluctuation value as a result of controlling the radar. The reliability of a determination may be measured by the processor by comparing the fluctuation value to a threshold value. That is, the processor may measure a fluctuation in a detection result obtained by the radar and measure a reliability by comparing the fluctuation with a threshold value.

FIG. 3 is a diagram illustrating an example of a vehicle radar controlling apparatus.

Referring to FIG. 3, a vehicle radar controlling apparatus 110 includes a sensor 301, a processor 303, an optional memory 305, and an RF transceiver 307.

The RF transceiver 307 includes a transmitting antenna array and a receiving antenna array. In the example show in FIG. 3, the transmitting antenna array includes at least three antennas forming a 2D array, such as, for example, antennas 311, 312, and 313. In this example, the antenna 313 may be arranged outside a line that is formed by the antenna 311 and the antenna 312. The RF transceiver 307 may change an azimuth and an elevation of a beam via the two-dimensionally arranged antennas. The receiving antenna array may include a plurality of antennas, for example, the antennas 321, 322, and 323. The antennas 321, 322, and 323 may form a one-dimensional (1D) array or a 2D array. The antennas 311, 312, and 313 that form the transmitting antenna array, and the antennas 321, 322, and 323 that form the receiving antenna array may be controlled independently to be turned on or off.

In one example, the RF transceiver 307 includes the phase shifter (not shown). The phase shifter may change a phase of each antenna included in the transmitting antenna array.

In one example, the RF transceiver 307 includes at least one radio frequency integrated circuit (RFIC) (not shown), and a transmitting antenna and a receiving antenna connected to the RFIC.

In one example, the RF transceiver 307 also includes a processor (not shown). For example, the RF transceiver 307 may include a microcontroller unit (MCU) or a field-programmable gate array (FPGA). In one example, the RF transceiver 307 also includes an interface (not shown), for example, a controller area network (CAN) and a local area network (LAN) interface. The RF transceiver 307 may control the antennas 311, 312, 313, 321, 322, and 323 by synchronizing them.

The sensor 301 may obtain sensor data of an internal environment and an external environment of a vehicle. The sensor 301 may detect an internal state of the vehicle, such as, for example, a control signal of the vehicle, a current speed of the vehicle, and a steering angle of a steering wheel of the vehicle. In one example, the sensor 301 may include or obtain sensor data from one or more internal sensors, for example, an IMU. The sensor 301 also may detect an external state of the vehicle via one or more external sensors, such as, for example, a radar, a LIDAR system or device, a camera, and an ultrasonic sensor, and the like.

The processor 303 is configured to determine environmental information of the vehicle based on the sensor data obtained from a sensor 301. The environmental information determined by the processor 303 may include road environment information and object environment information. Road environment information may include information associated with one or more of a width, a slope, a rotation radius, and/or information about a road on which the vehicle is traveling, such as the lanes of a road. Object environment information may include information associated with one or more of a position, a size, a speed, and/or a direction of an object. The object may include a target object and an occluded object. A target object refers to a target to be detected, and an occluded object refers to an object that may hinder detection of a target object.

The processor 303 may estimate or determine road environment information including information associated with a shape of the road or a type of road. For example, the processor 303 may calculate a curvature and a slope of a road based on internal sensor data, such as a rotation angle of the steering wheel of the vehicle and or an acceleration detected from the IMU. The processor 303 may calculate a width of the road and obtain lane information using data received from an external sensor, such as a camera. For example, the processor may process an image obtained from the camera to identify the road and an object (e.g., target or occluded).

The processor 303 may determine a radar mode of the vehicle based on the environmental information. For example, the processor 303 may determine or select a radar mode from a number of specific or pre-defined radar modes, such as the digital beamforming mode, the analog beamforming mode, the hybrid beamforming mode, the SRR mode, the MRR mode, and the LRR mode corresponding to the environmental information, as described in detail above. The processor 303 generates a control signal based on the determined radar mode. The processor 303 controls a transmitting antenna array and/or a receiving antenna array using the control signal provided to the RF transceiver 307. The control signal indicates whether an antenna of an array operates in an "on" or and "off" state. In the "on" state, an antenna of the transmitting array may transmit an RF signal and an antenna of the receiving array may receive an RF signal.

In one example, the processor 303 controls a phase of each of the antennas using the phased array method described above according to the determined radar mode.

For example, using the phased array method the processor 303 is configured to perform beamforming or beamsteering on a plurality of RF signals transmitted from the transmitting array. In this example, the processor 303 is configured generate a control signal corresponding to the radar mode. The control signal provided to the RF transceiver to control the phase shifter. The phase shifter adjusts the phase of the plurality of antennas included in the transmitting antenna as indicated by the control signal.

In one example, the vehicle radar controlling apparatus 110 includes the memory 305. The memory 305 may store information associated with a radiation beam pattern or a beam pattern. The pattern determines whether an antenna included in the transmitting antenna array is turned on or off and the operation of the. The memory 305 also may store a plurality of radar modes defined based on a detectable azimuth, a detectable range, or a detectable elevation. The processor 303 may determine a radar mode of the vehicle among the radar modes stored in the memory 305.

In another example, a vehicle radar controlling apparatus includes a first processor and the RF transceiver includes a second processor. In this example, the first processor collects environmental information of a vehicle using sensor data and determines a radar mode of the vehicle based on the environmental information. The second processor controls the transmitting antenna array of the vehicle or the receiving antenna array of the vehicle based on the radar mode determined by the first processor.

Figure 4A:
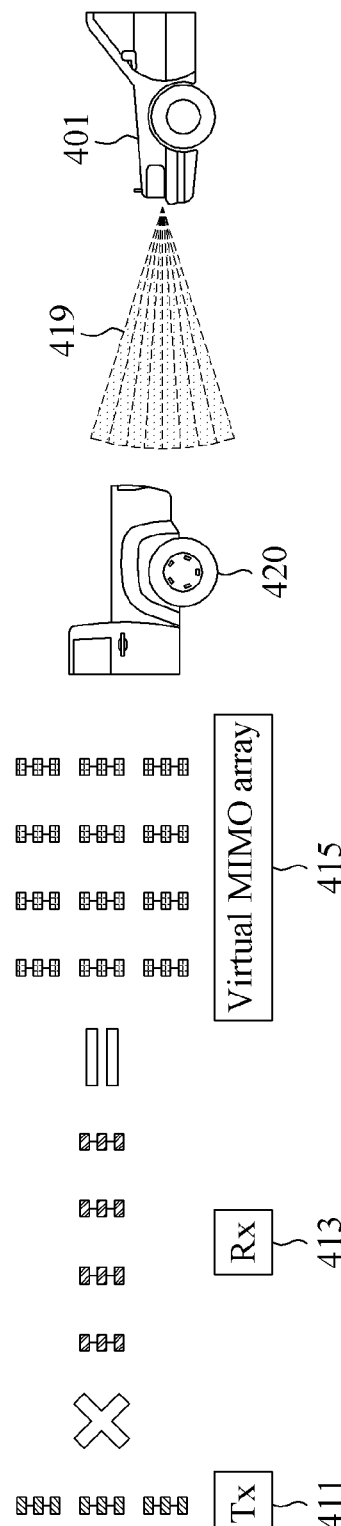
FIG. 4A is a diagram illustrating an example of a virtual multiple-input and multiple-output (MIMO) array based on digital beamforming.
Figure 4B:
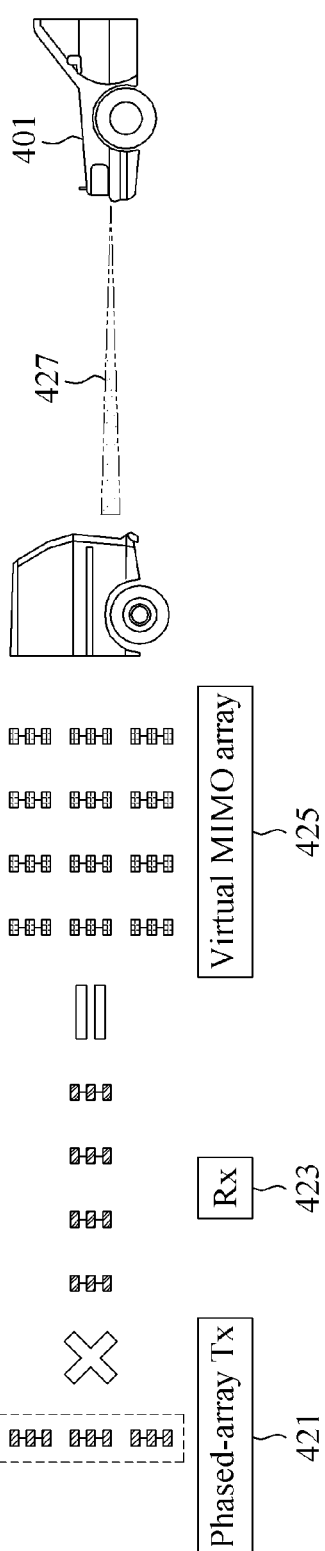
FIG. 4B is a diagram illustrating an example of a virtual MIMO array based on analog beamforming.

FIG. 4A is a diagram illustrating an example of a virtual MIMO array based on digital beamforming. FIG. 4B is a diagram illustrating an example of a virtual MIMO array based on analog beamforming.

The example shown in FIG. 4A includes a vehicle 401 having a transmitting antenna array 411 and a receiving antenna array 413. In this example, the antennas included in the transmitting antenna array 411 are arranged in a vertical direction, and antennas included in a receiving antenna array 413 are arranged in a horizontal direction. Transmitting antenna array 411 and the receiving antenna array 413 may be combined to form the virtual MIMO array 415.

The vehicle radar controlling apparatus transmits an RF signal using digital beamforming via a transmitting antenna array 411. In this example, the vehicle radar controlling apparatus controls the transmitting antenna array 411 to emit RF signals from the antennas that are orthogonal to each other. For example, the vehicle radar controlling apparatus may control the transmitting antenna array 411 to emit RF signals having phases, codes, times, and/or frequencies, and the like, that are orthogonal to each other. The orthogonality of signals may be used to distinguish between a plurality of RF signals transmitted from different antennas of the transmitting array 411.

The vehicle radar controlling apparatus causes the transmitting antenna array 411 to radiate a plurality of beams at a desired elevation. In addition, the receiving antenna array 413 receives reflected beans, and the vehicle radar controlling apparatus processes the signals received from the antenna array to determine an angular resolution corresponding to an elevated direction. The virtual MIMO array 415 may be combined in a range direction to form a three-dimensional (3D) detection coverage volume 419 to detect a target object 420.

The example shown in FIG. 4B includes a vehicle 401 having a transmitting antenna array 421 and a receiving antenna array 423. In this example, the antennas included in the transmitting antenna array 421 are arranged in a vertical direction, and antennas included in a receiving antenna array

423 are arranged in a horizontal direction. Transmitting antenna array 421 and the receiving antenna array 423 may be combined to form the virtual MIMO array 425. In this example, the virtual MIMO array 425 may be formed with a single row of antennas in the transmitting array 421 and combined in a range direction to form a 2D detection range.

Referring to FIG. 4B, the vehicle radar controlling apparatus causes the transmitting antenna array 421 to transmit an RF signal using analog beamforming. In this example, the vehicle radar controlling apparatus performs beamforming with a single beam 427 by changing a phase of each of the RF signals transmitted from the antennas using the phased array method. A beam formed by phased array increases the intensity of the beam resulting in a relatively higher reception gain from the intensified beam. However, in this example, the beam does have an angular resolution in an elevated direction. As a result, the virtual MIMO array 425 may not have an angular resolution in a vertical or an elevated direction that is provided by the virtual MIMO array 415

The vehicle radar controlling apparatus may determine whether a detection in an elevated direction is needed based on the environmental information. In response to a determination that an elevated direction detection is needed, the vehicle radar controlling apparatus is configured to control a radar using the digital beamforming as described with reference to FIG. 4A. In response to a determination that no elevation direction detection is needed, the vehicle radar controlling apparatus is configured to control the radar using the analog beamforming as described with reference to FIG. 4B. Although a detection coverage volume/area is reduced, the analog beamforming may obtain a greater gain as compared with the digital beamforming enabling detection of a target object at a longer range.

Figure 5A:
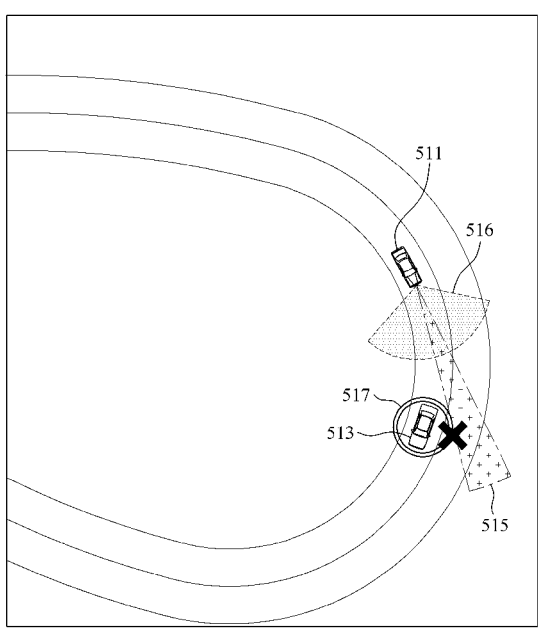
FIG. 5A is a diagram illustrating an example of an unsuccessful detection of a target object on a curved road.
Figure 5B:
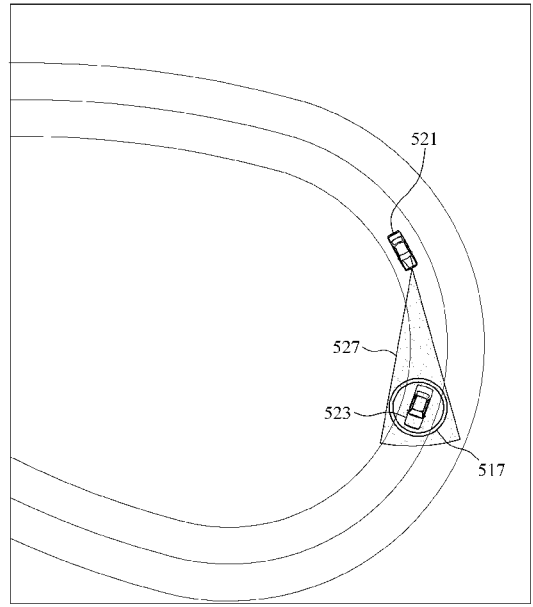
FIG. 5B is a diagram illustrating an example of a successful detection of a target object on a curved road using an apparatus for controlling a radar of a vehicle.

FIG. 5A is a diagram illustrating an example of an unsuccessful detection of a target object on a curved road. FIG. 5B is a diagram illustrating an example of a successful detection of a target object on a curved road using a vehicle radar controlling apparatus.

As shown in FIG. 5A, a vehicle 511 having a set or fixed detection coverage does not detect a target object 513 on a sharp curved road. FIG. 5A illustrates the trade-off between the detection coverage and a gain of the radar due to the limited resources of the vehicle 511. For example, a first radar mode may have a narrow detection coverage 515 and a relatively higher gain, and a second radar mode may have a wide detection coverage 516 and a relatively lower gain. Thus, a blind spot 517 occurs on the curved road regardless of the radar mode provided as illustrated in FIG. 5A. As a result, a target object 513 located in the blind spot 517 may not be detected.

As shown in FIG. 5B, a vehicle 521 having variable detection coverage detects a target object 523 on a sharp curved road eliminating the blind spot 517 shown in FIG. 5A. In this example, the vehicle 521 is equipped with a vehicle radar controlling apparatus. The vehicle radar controlling apparatus collects environmental information including information associated with a shape or a type of a road or a location of the target object 523 based on sensor data. The vehicle radar controlling apparatus determines a radar mode enabling an effective detection of the target object 523 based on the collected environmental information. As illustrated, the vehicle radar controlling apparatus detects the target object 523 using radar mode having a detection coverage 527 optimized for the vehicle's environment. For example, the direction and range of the radar beams are changed to account for the curvature of the road and speed at which the vehicle 521 is traveling.

Figure 6A:
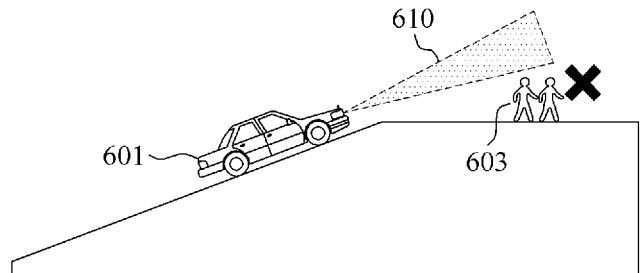
FIG. 6A is a diagram illustrating an example of failure to detect a target object on flat ground above a vehicle traveling uphill.
Figure 6B:
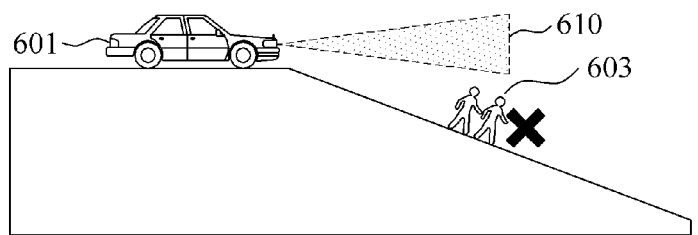
FIG. 6B is a diagram illustrating an example of failure to detect a target object downhill from a vehicle traveling on flat ground.
Figure 6C:
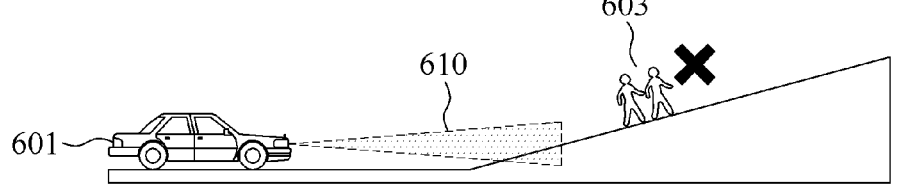
FIG. 6C is a diagram illustrating an example of failure to detect a target object uphill from a vehicle traveling on flat ground.

FIG. 6A is a diagram illustrating an example of failure to detect a target object on flat ground above a vehicle traveling uphill. FIG. 6B is a diagram illustrating an example of failure to detect a target object downhill from a vehicle traveling on flat ground. FIG. 6C is a diagram illustrating an example of failure to detect a target object uphill from a vehicle traveling on flat ground. These examples illustrate that a vehicle 601 having a fixed elevation detection coverage may not detect a target object 603 when a slope of a road the vehicle 601 is travelling on changes.

Referring to FIG. 6A, a vehicle 601 travels on an uphill road. Ahead of the vehicle 601, the slope of the uphill road becomes flat, and a target object 603 located on the flat ground is in a blind spot outside of the coverage area 610 of the vehicle's radar.

Referring to FIG. 6B, a vehicle 601 travels on a flat road. Ahead of the vehicle 601, the slope of the road changes to a downhill road, and a target object 603 located on the downhill portion of the road is in a blind spot outside of the coverage area 610 of the vehicle's radar.

Referring to FIG. 6C, a vehicle 601 travels on a flat road. Ahead of the vehicle 601, the slope of the road changes to an uphill road, and a target object 603 located on the uphill road is in a blind spot outside of the coverage area 610 of the vehicle's radar.

Figure 6D:
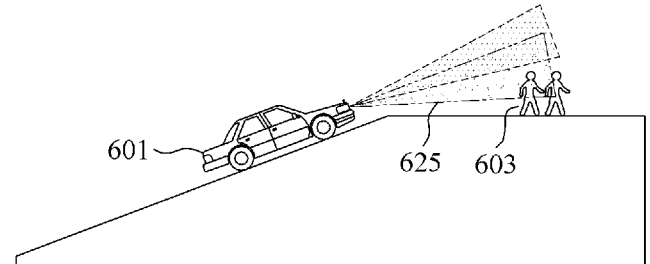
FIG. 6D is a diagram illustrating an example of successfully detecting a target object on flat ground above a vehicle traveling uphill using an apparatus for controlling a radar of a vehicle.
Figure 6E:
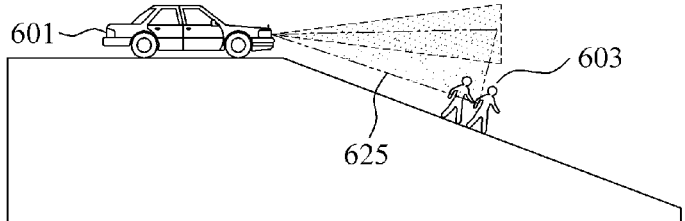
FIG. 6E is a diagram illustrating an example of successfully detecting a target object uphill from a vehicle traveling on flat ground using an apparatus for controlling a radar of a vehicle.
Figure 6F:
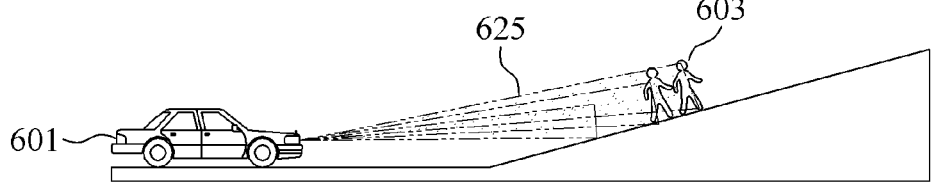
FIG. 6F is a diagram illustrating an example of successfully detecting a target object on a flat ground above a vehicle traveling up an incline using an apparatus for controlling a radar of a vehicle.

FIG. 6D is a diagram illustrating an example of successfully detecting a target object on flat ground above a vehicle traveling uphill using an apparatus for controlling a radar of a vehicle. FIG. 6E is a diagram illustrating an example of successfully detecting a target object uphill from a vehicle traveling on flat ground using an apparatus for controlling a radar of a vehicle. FIG. 6F is a diagram illustrating an example of successfully detecting a target object on a flat ground above a vehicle traveling up an incline using an apparatus for controlling a radar of a vehicle.

Referring to FIG. 6D, a vehicle 601 travels on an uphill road. Ahead of the vehicle 601, the slope of the uphill road becomes flat, and a target object 603 is located on the flat ground. The vehicle radar controlling apparatus of the vehicle 601 collects environmental information including information associated with a change in slope of the road and estimates a change in the slope of the road using data collected from a sensor. In response to the estimated road slope, the vehicle radar controlling apparatus of the vehicle 601 determines a radar mode having a detection coverage 625 with an increased elevated direction to detect the target object 603.

Referring to FIG. 6E, a vehicle 601 travels on a flat road. Ahead of the vehicle 601, the slope of the road becomes downhill, and a target object 603 is located on the downhill road. The vehicle radar controlling apparatus of the vehicle 601 collects environmental information including information associated with a change in slope of the road and estimates a change in the slope of the road using data collected from a sensor. In response to the estimated road slope, the vehicle radar controlling apparatus of the vehicle 601 determines a radar mode having a detection coverage 625 with a decreased elevation direction to detect the target object 603 downhill from the vehicle 601.

Referring to FIG. 6F, a vehicle 601 travels on a flat ground. Ahead of the vehicle 601, the slope of the flat road becomes uphill, and a target object 603 is located on the uphill road. The vehicle radar controlling apparatus of the vehicle 601 collects environmental information including information associated with a change in slope of the road and estimates a change in the slope of the road using data collected from a sensor. In response to the estimated road slope, the vehicle radar controlling apparatus of the vehicle 601 determines a radar mode having a detection coverage 627 with an increased elevated direction to detect the target object 603.

The vehicle radar controlling apparatuses, the vehicle 101, the vehicle radar controlling apparatus 110, sensor 301, processor 303, memory 305, RF transceiver 307, antennas 3111, 312, 313, 321, 322, 323, transmitters, receivers, and other apparatuses, units, modules, and components described herein with respect to FIGS. 1-6F are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6F that perform the operations described in this application are performed by computing hardware, for example, by one or more processors or computers, implemented as described above executing instructions or software to perform the operations. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media.

Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile random access memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions.

In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle radar control method, the method comprising:
collecting internal environmental information of the vehicle;
determining, from among a plurality of radar modes corresponding to different detectable azimuths, a radar mode of the vehicle based on the collected internal environmental information, and
performing beamsteering by controlling either one or both of a transmitting antenna array and a receiving antenna array of the vehicle based on the determined radar mode.

2. The method of claim 1, wherein the internal environmental information comprises at least one of a rotational angle of vehicle obtained through a steering wheel of the vehicle and IMU sensor of the vehicle.

3. The method of claim 1, wherein the internal environmental information comprises a rotation angle of the vehicle through a steering wheel of the vehicle.

4. The method of claim 3, wherein in response to a first rotation angle of the vehicle is bigger than the second rotation angle of the vehicle, a first radar mode determined for the first rotation angle corresponds to a broader field of view than a second radar mode determined for the second rotational angle.

5. An apparatus comprising:
a processor, and
a memory coupled to the processor, storing a computer program which, when executed by the processor, cause the processor to implement the method of claim 1.

6. A vehicle comprising:
a processor, and
a memory coupled to the processor, storing a computer program which, when executed by the processor, cause the processor to implement the method of claim 1.

* * * * *